US006047779A

United States Patent [19]

Wallace

[11] Patent Number: 6,047,779

[45] Date of Patent: Apr. 11, 2000

[54] TWIN LOBE IMPACT MECHANISM

[75] Inventor: William Keith Wallace, Barneveld, N.Y.

[73] Assignee: Chicago Pneumatic Tool Company, Rock Hill, S.C.

[21] Appl. No.: 09/164,561

[22] Filed: Oct. 1, 1998

Related U.S. Application Data

[62] Division of application No. 08/902,385, Jul. 29, 1997, Pat. No. 6,003,618.

[51] Int. Cl.[7] ............................ B23B 45/16; B25D 15/02

[52] U.S. Cl. ............................................. 173/93.5; 173/93

[58] Field of Search ........................... 173/93, 93.5, 93.6, 173/93.7, 104

[56] References Cited

U.S. PATENT DOCUMENTS

| | | | |
|---|---|---|---|
| 2,514,914 | 7/1950 | Van Sittert | 173/93.5 |
| 2,850,128 | 9/1958 | Sittert . | |
| 2,863,539 | 12/1958 | Yeager | 173/93.5 |
| 2,881,884 | 4/1959 | Amtsberg | 173/93.6 |
| 2,947,283 | 8/1960 | Roggenburk . | |
| 3,174,597 | 3/1965 | Schaedler et al. . | |
| 3,389,756 | 6/1968 | Kawamoto . | |
| 3,414,065 | 12/1968 | Falter | 173/93.5 |
| 3,428,137 | 2/1969 | Schaedler et al. . | |
| 3,610,344 | 10/1971 | Schoeps et al. | 173/93.5 |
| 3,730,281 | 5/1973 | Wood . | |
| 4,002,212 | 1/1977 | Schoeps . | |
| 4,347,902 | 9/1982 | Wallace et al. . | |
| 4,460,049 | 7/1984 | Shibata | 173/93.5 |
| 4,479,555 | 10/1984 | Grossman et al. . | |
| 4,557,337 | 12/1985 | Shibata . | |
| 4,712,456 | 12/1987 | Yuan . | |
| 5,083,619 | 1/1992 | Giardino et al. | 173/93.5 |
| 5,209,308 | 5/1993 | Sasaki . | |
| 5,343,961 | 9/1994 | Ichikawa . | |

FOREIGN PATENT DOCUMENTS

| | | |
|---|---|---|
| 0149874 | 5/1984 | European Pat. Off. . |
| 116436 | 8/1929 | Germany . |
| 2047442 | 3/1972 | Germany . |
| 2364344 | 6/1975 | Germany . |

*Primary Examiner*—Scott Smith
*Attorney, Agent, or Firm*—Schmeiser, Olsen & Watts

[57] ABSTRACT

The present invention relates an impact tool with a twin lobed anvil, and the separate anvil, timing shaft and mating dog hammer. The impact transmission is configured in such a way so as to maintain contact between the anvil and dog hammer. As a result, the components of the present invention provide a harder blow to the anvil of an impact tool due to a larger strike surface area, provide greater torque due to increased mass at engagement, and increase the durability of the impact tool.

5 Claims, 5 Drawing Sheets

TWIN LOBE IMPACT MECHANISM

This application is a divisional of application Ser. No. 08/902,385, filed Jul. 29, 1997, now U.S. Pat. No. 6,003, 618.

BACKGROUND OF THE INVENTION

1. Technical Field

The present invention relates generally to impact tools. More particularly, the invention relates to an impact tool with a twin lobed anvil, and the separate anvil, timing shaft and mating dog hammer. In combination, the components provide a harder blow to the anvil of an impact tool due to a larger strike surface area, provide greater torque due to increased mass at engagement, and increase the durability of the impact tool.

2. Related Art

Heretofore, related art impact tools have transmitted impact between a dog hammer and anvil in a variety of ways. For instance, as shown in U.S. Pat. No. 3,428,137, a common way of transmitting an impact is to use a cantilevered hammer and cantilevered anvil. This structure is commonly called a pin or teeth clutch. In these devices, the anvil and hammer each include teeth that engage one another upon movement of the hammer towards the anvil. Unfortunately, the teeth of the anvil have a limited strike surface area, thereby limiting the strength of impact.

It is, therefore, an aim of the present invention to provide an impact transmission which overcomes the above disadvantages of the related art.

SUMMARY OF THE INVENTION

In accordance with the present invention, an impact tool and impact transmission component parts thereof are provided which increase the strength of the transmission and reduce the impact transmitted to a user.

The present invention provides an impact tool comprising an anvil having two impact receiving lobes, a timing shaft operatively coupled to the anvil for timing the impact, and a dog hammer having a surface shaped to conform to the lobes of the anvil.

The present invention is also an apparatus comprising: an anvil having rounded projections extending therefrom, a dog hammer including an anvil receiving portion having a first tier and second tier and a ring guidance portion that encircles the outer periphery of the projections of the anvil. The first tier of the dog hammer including a portion that supports the lobes during non-impacting transmission and the second tier being shaped to receive the two lobes of the anvil during an impacting transmission. The apparatus also includes a timing shaft to time the impact transmission occurrences.

The invention is also the component parts of the impact transmission including an anvil, timing shaft and dog hammer. The anvil in accordance with the present invention includes a substantially circular plate portion surrounding the bore of the anvil at a rear end of the anvil and at least two lobes extending from the plate adapted to receive an impact. The dog hammer in accordance with the present invention includes a ring guidance surface for supporting the anvil, a recessed first tier for supporting an impact portion of an anvil during a non-impact timing, and a further recessed second tier for impacting an impact portion of an anvil during an impact timing. The timing shaft in accordance with the present invention includes an anvil rotation transmission portion, a ball timing portion with a groove to rotatably support a ball, and a rotor connection portion.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Figure 1:
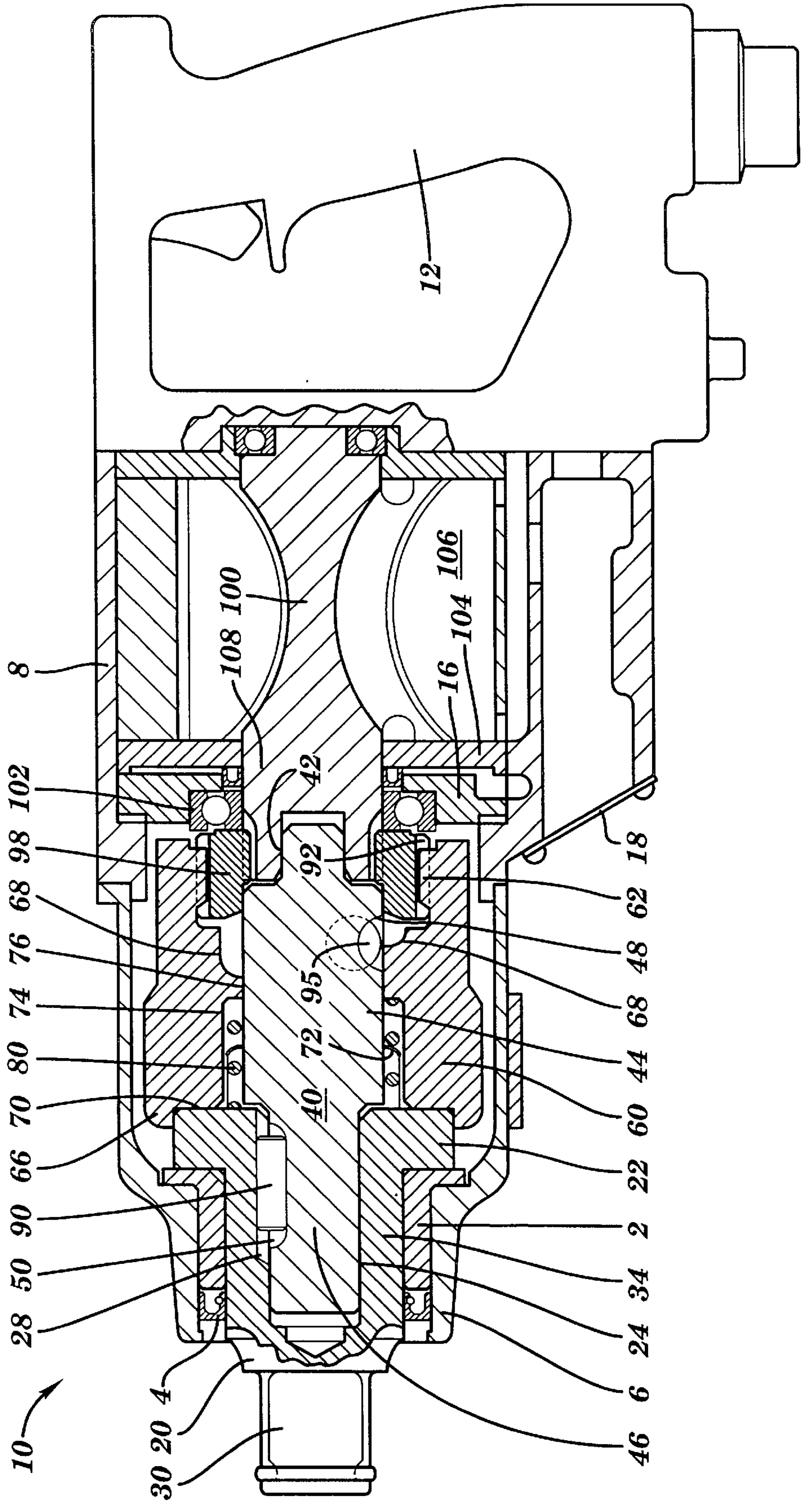
FIG. 1 shows a cross-sectional view of an impact tool in accordance with the present invention.
Figure 2:
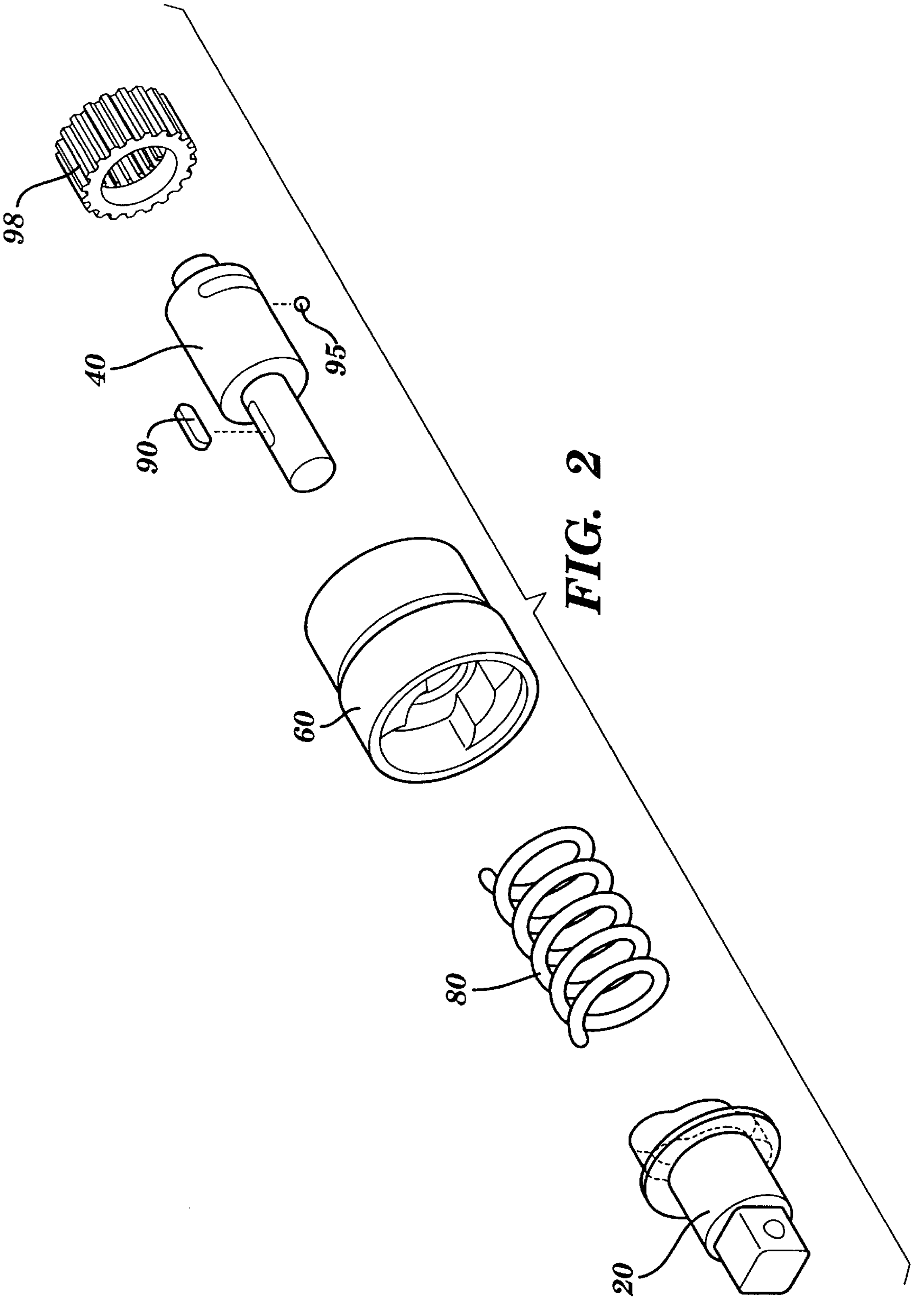
FIG. 2 shows an exploded perspective view of the impact transmission in accordance with the present invention.

In FIG. 1, a cross-sectional view of an impact tool 10 in accordance with the present invention is disclosed. The impact tool 10 generally includes a handle 12 connected to the rear of a motor housing 8 which is in turn connected to an impact transmission section housing 6. The handle 12 can be of any conventional configuration to selectively supply pressurized fluid to the motor housing 8 and, accordingly, will not be described in detail herein.

The motor housing 8 generally includes a rotor 100 including rotor blades 106 which are turned by the flow of pressurized fluid (e.g., pneumatically driven) through the motor housing 8 as is conventional. The rotor housing has a front end defined by plate 104 that holds the rotor in the motor housing 8. The rotor also includes a rotor output shaft 108 that extends through the plate 104 and is rotatably connected to the impact transmission to be described in detail hereafter. The rotor output shaft 108 is supported by a bearing 16 within the motor housing 8.

The impact transmission of the present invention generally includes an anvil 20, a timing shaft 40 and a dog hammer 60. The impact transmission being rotatably coupled to the rotor output shaft 108 by a coupling 98 which includes interior and exterior 92 splines. The interior splines mating with exterior splines of the rotor output shaft 108. The exterior splines 92 mating with interior splines 62 located on a rear interior of the dog hammer 60.

Figure 4:
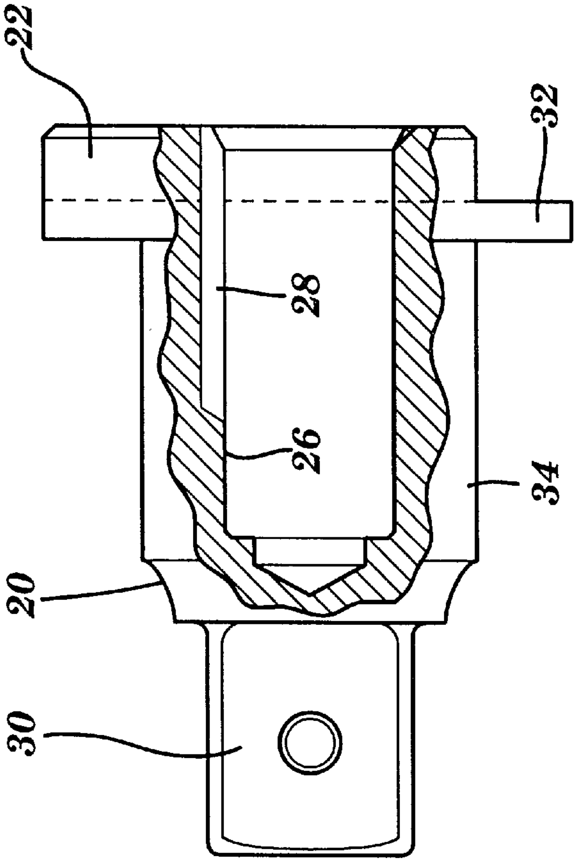
FIG. 4 shows a plan view of the anvil partially in cross-section as indicated by line 4—4 in FIG. 3.
Figure 3:
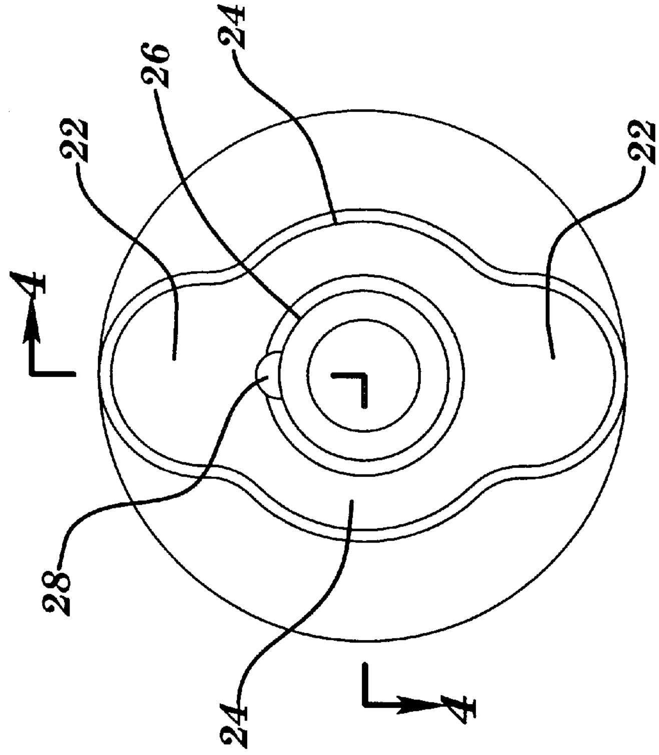
FIG. 3 shows a rear view of the anvil in accordance with the present invention.

Turning to the anvil 20, as shown in FIGS. 3 and 4, the anvil 20 includes a generally cylindrical body 34 including a bore 26 extending partially therein. The bore 26 includes a groove or keyway 28 to receive a key 90 that mates with a groove or keyway in the timing shaft 40. At a front end of the anvil 20, an output shaft 30 is provided which can receive a variety of tools (not shown). The rear end of the anvil includes a substantially circular plate portion 32 that extends radially from an outer surface of the cylindrical portion 34.

On the circular plate 32, the anvil includes at least two rearwardly projecting projections or lobes 22 which receive the impact transmission from the dog hammer 60. As shown in FIG. 3, the lobes 22 and area which connects the lobes to one another is generally in an elliptical shape with a swelled or tumescent center 24.

Figure 6:
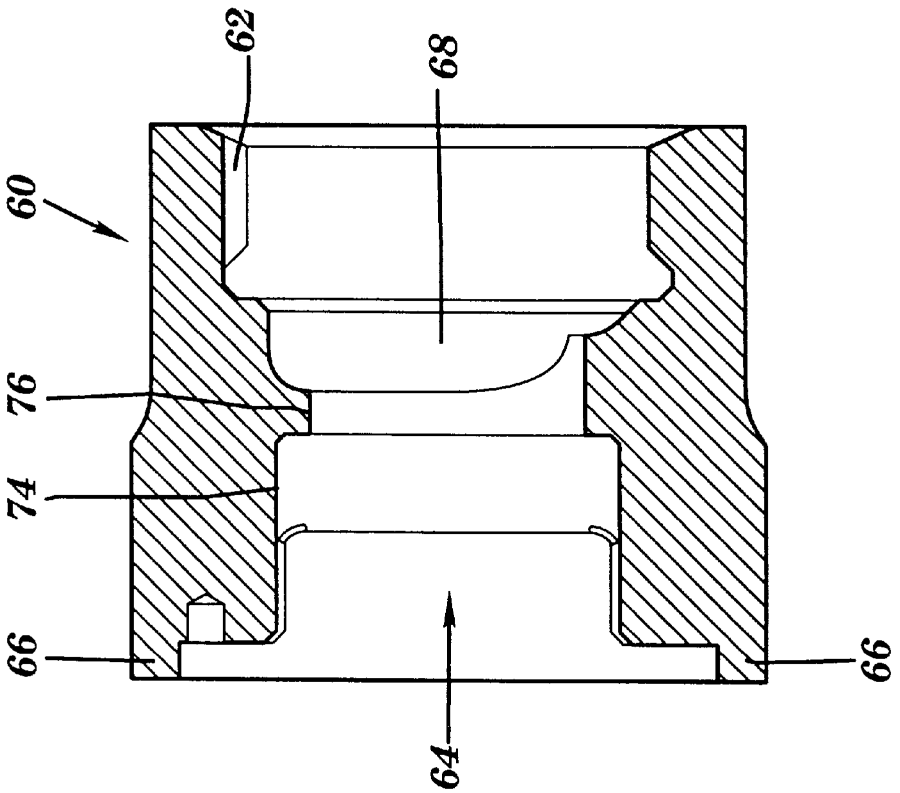
FIG. 6 shows a cross-sectional view of the dog hammer.
Figure 5:
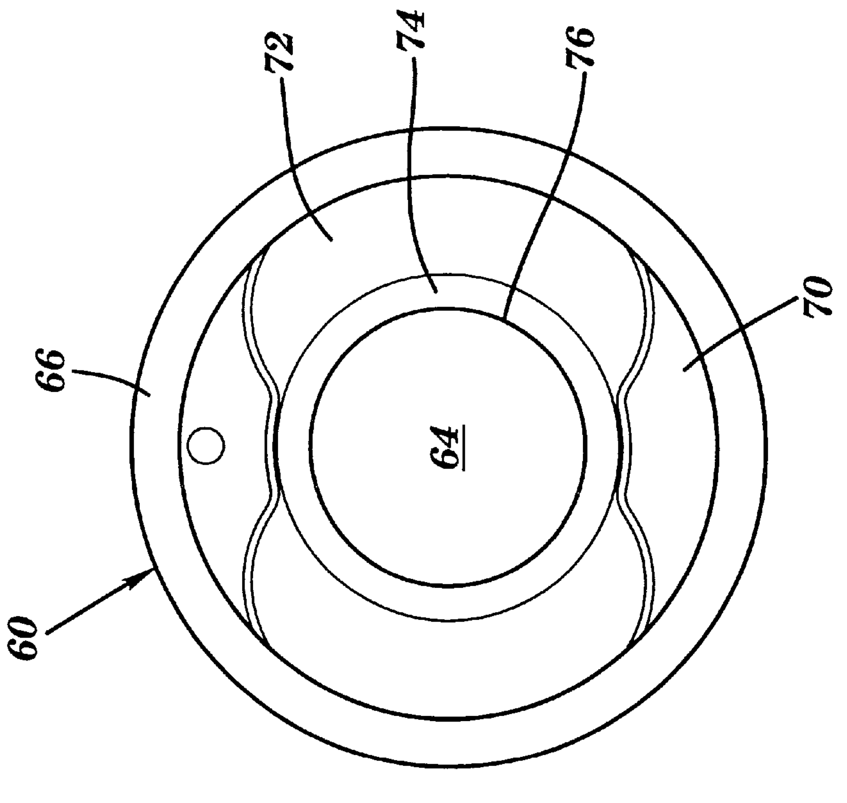
FIG. 5 shows a front view of the dog hammer in accordance with the present invention.

The dog hammer 60, as shown in FIGS. 5 and 6, is generally a cylindrical member have a series of differently sized bores extending therethrough. First, the dog hammer includes a circular guidance surface or flange 66 which encircles the circular plate 32 of the anvil to assure proper alignment of the anvil 20 and dog hammer 60. Inwardly of the guidance surface or flange 66, the dog hammer includes tiered anvil mating recesses 70 and 72. The first tiered recess 70 engages the lobes 22 of the anvil 20 during a non-impacting timing of operation. A further recessed, second tier 72 engages the lobes 22 during impact timing to transmit the impact from the dog hammer 60 to the anvil 20. The second tier 72, as shown in FIG. 5, is generally in a shape that mates with the elliptical shape with tumescent center shape of the lobes 22. In other words, the second tier is generally hourglass shaped as can be seen from FIG. 5.

Further recessed from the second tier 72, the dog hammer 60 includes a throughbore 76 which is sized to accommodate the passage of the timing shaft 40 therethrough. The bore 74 that extends from the second tier 72 to the throughbore 76 serves a double purpose, that of a spring 80 engaging groove. Adjacent the throughbore 76, the dog hammer includes a ball engaging track 68 which, as the track progresses around the interior of the dog hammer 60, progresses to a peak (not shown), to drive the dog hammer into impact engagement with the anvil 20. The ball 95, as shown in FIG. 1, being located between the dog hammer 60 and timing shaft 40.

Adjacent to the ball engaging track 68, the dog hammer includes a splined bore 62 which, as noted earlier mates with the exterior splines of coupling 98 to receive rotational transmission from the rotor 100.

Figure 8:
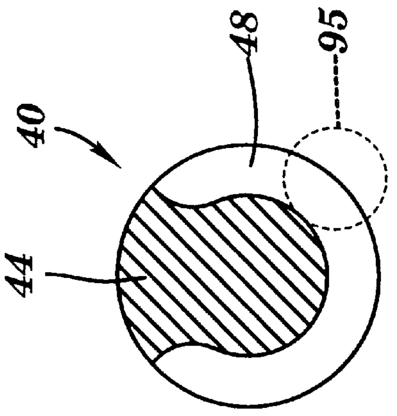
FIG. 8 shows a width-wise cross-sectional view of the timing shaft.
Figure 7:
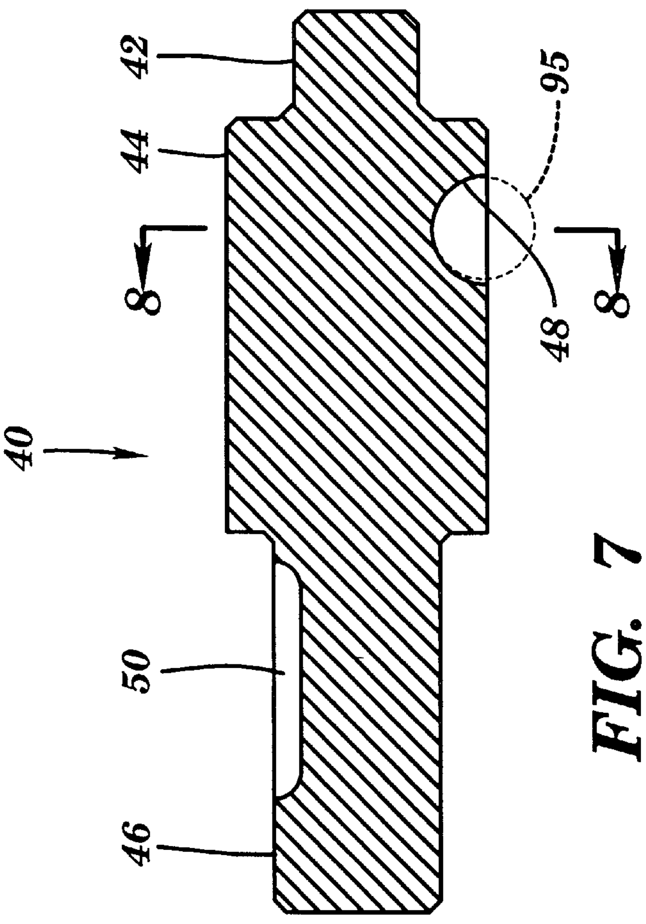
FIG. 7 shows a lengthwise cross-sectional view of the timing shaft in accordance with the present invention.

Turning to FIGS. 7 and 8, the timing shaft of the present invention is shown. The timing shaft generally includes a shaft of three different diameters. A first portion 46 is sized to be accommodated in the bore 26 of the anvil and includes a groove 50 to receive a pin 90. The pin 90 assures rotation of the timing shaft 40 and anvil 20 together. A second intermediate portion 44 of the timing shaft is sized to be accommodated in the throughbore 76 of the dog hammer 60. The second intermediate portion 44 also including a ball engaging track 48 to accommodate rotation of the ball 95. As shown in FIG. 8, the ball engaging track 48 of the timing shaft extends around approximately 270° of the timing shaft diameter.

Lastly, the timing shaft includes a third rotor output shaft 108 engaging portion 42. As shown in FIG. 1, this portion is received on an internal bore of the rotor output shaft 108 for non-power transmitting support. A rear portion of the second intermediate portion 44 is also rotatably supported in the coupling 98.

As a whole, the impact transmission is housed within the housing 6, as shown in FIG. 1. The anvil 20 is rotatably mounted in the front portion of the housing 6 via a seal 4 and bushing 2. The timing shaft first portion 46 extends into the anvil bore 24 and is rotatably connected to the anvil via pin 90. The circular plate 32 of the anvil rests in the guidance surface 66 of the dog hammer 60 so that the anvil 20 is always in some minimal engagement with the dog hammer 60. In particular, the outer surfaces of the lobes 22 are always within the guidance surface or flange 66. Furthermore, in a non-impacting timing, the lobes 22 rests against the first tier recess 70 of the dog hammer 60. When the dog hammer rotates to impact the anvil 20, the lobes 22 receive the impact upon entrance of the lobes 22 into the second tier recess 72. To return the anvil 20 to its non-impact position relative to the dog hammer 60, a spring 80 is compressed within groove 74 between a rear portion of the anvil 20 and the dog hammer 60.

Timing of the impacts is determined by the structural relationship of the ball engaging tracks 48, 68 of the timing shaft 40 and dog hammer 60, respectively. As the ball rotates around the ball engaging track 48 of the timing shaft it eventually meets an end of the track such that it rotates in place with respect to the timing shaft 40. As the dog hammer continues to rotate, the ball 95 follows the ball engaging track 68 of the dog hammer and passes over the peak within the track. The positioning of the peak is set such that the time the ball passes over the peak coincides with the time the lobes 22 of the anvil are in position to enter the second tier recess 72 of the dog hammer.

As a result, the dog hammer impacts the lobes 22 of the anvil with the second tiered recess 72 to transmit an impact. However, since the anvil 20 and dog hammer 60 are always in some contact with each other, excess energy stored in the dog hammer is not allowed to recoil the dog hammer into the housings 6, 8, thus transmitting the impact to the user. Overall, the tool exhibits increased durability because of removal of the jolting non-contact to immediate contact of the related art. In particular, the maintenance of contact between the anvil 20 and dog hammer 60 allows for a less jolting impact transmission engagement and, thus, creates a stronger transmission which is also more durable.

Further adding to the more efficient impact transmission is the capability of the present invention to maintain the velocity of the dog hammer as slow as possible so less excess energy is stored in it by increasing the number of degrees necessary to accelerate the dog hammer. Additionally, the time that the dog hammer clears the anvil is set such that the dog hammer is moving the fastest at that point but also such that the average velocity is as low as possible. These provisions are created by the particular track paths created in the timing shaft 40 and dog hammer 60.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A dog hammer for use with an anvil having an impact portion in an impact tool, the dog hammer comprising:

a flanged portion adapted to engage an anvil;

a first surface axially displaced from the flanged portion and shaped to conform with the impact portion of the anvil, and adapted to support the impact portion of the anvil during a non-impact timing; and a second surface axially displaced from the first surface and shared to conform with the impact portion of the anvil, and adapted to impact the impact portion of the anvil during an impact timing.

2. The dog hammer of claim 1, further including:

a bore extending therethrough adapted to accommodate a timing shaft of the impact tool;

a ball engaging track; and a power transmission portion.

3. The dog hammer of claim 2, wherein the power transmission portion includes a splined bore adapted to engage a splined coupling.

4. The dog hammer of claim 3, further including a spring engaging surface between the bore and second surface.

5. The dog hammer of claim 1, wherein the second surface has an hourglass shape.

* * * * *

UNITED STATES PATENT AND TRADEMARK OFFICE

CERTIFICATE OF CORRECTION

PATENT NO. : 6,047,779

DATED : April 11, 2000

INVENTOR(S) : Wallac, William K.

It is certified that error appears in the above-identified patent and that said Letters Patent is hereby corrected as shown below:

Column 5, line 2, delete "shared" and insert --shaped--.

Signed and Sealed this

Thirtieth Day of January, 2001

Attest:

Q. TODD DICKINSON

*Attesting Officer*

*Director of Patents and Trademarks*